Sept. 9, 1924.
C. E. MONTGOMERY
SNUBBER FOR AUTOMOBILES
Filed April 19, 1923
1,508,346
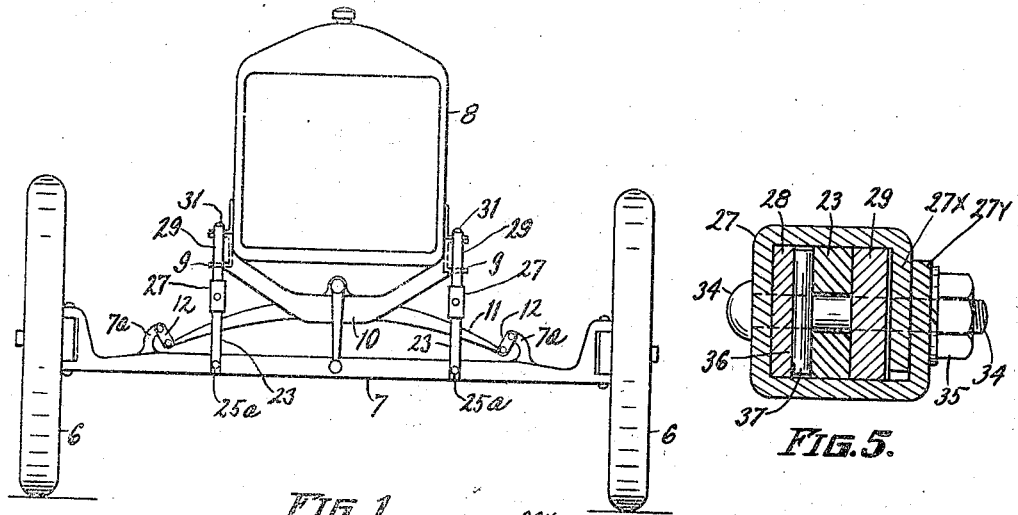
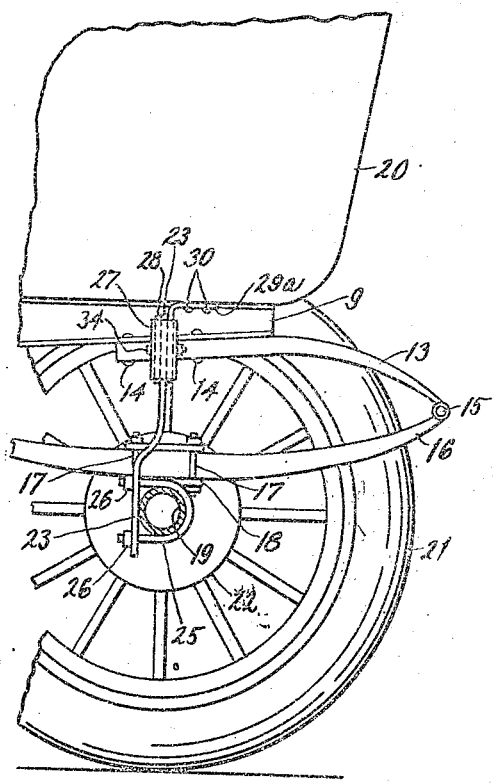
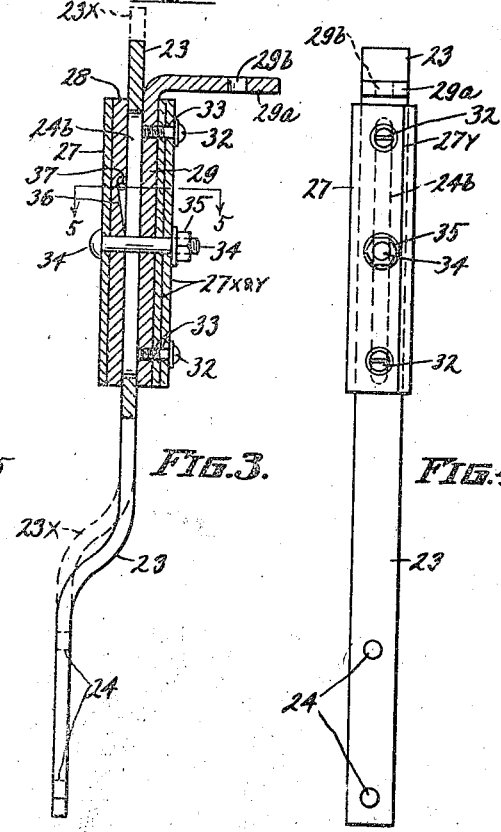
INVENTOR:
Clifton E. Montgomery
BY A. M. Carlsen
ATTORNEY.

Patented Sept. 9, 1924.

1,508,346

UNITED STATES PATENT OFFICE.

CLIFTON E. MONTGOMERY, OF ST. PAUL, MINNESOTA, ASSIGNOR OF ONE-HALF TO HENRY ARNDT, OF ST. PAUL, MINNESOTA.

SNUBBER FOR AUTOMOBILES.

Application filed April 19, 1923. Serial No. 633,326.

*To all whom it may concern:*

Be it known that I, CLIFTON E. MONTGOMERY, a citizen of the United States, residing at St. Paul, in the county of Ramsey and State of Minnesota, have invented certain new and useful Improvements in Snubbers for Automobiles, of which the following is a specification.

My invention relates to snubber devices particularly adapted for the pleasure-car type of automobiles and the object is to provide a simple and efficient device readily attached to an automobile to prevent violent jarring or shocks to the occupants of a car.

In the accompanying drawing:—

Fig. 1 is a front view of a Ford type of automobile and two of my devices applied adjacent its front spring.

Fig. 2 is a vertical sectional elevation of the rear right hand portion of an automobile and one of my devices installed adjacent the right hand body supporting springs.

Fig. 3 is a side elevation of one of my devices shown partly in section.

Fig. 4 is Fig. 3 viewed from right to left.

Fig. 5 is an enlarged section as on the line 5—5 in Fig. 3.

Referring to the drawing by reference numerals, in Fig. 1 6 are the front ground wheels, 7 is the front axle, 8 the radiator, 9 the main frame channels connected by a bracket 10 secured to a transversely arranged half elliptic type spring 11 the ends of which are pivotally secured in clips 12 which in turn are pivotally secured in front axle brackets 7ª.

In Fig. 2 I have shown the longitudinally arranged type of body supporting spring comprising an upper short section 13 secured to the frame as at 14 and connected at 15 to the lower elliptic spring section 16, the latter being suitably secured as at 17 to a block 18 on the rear axle housing 19. 20 is the car body, 21 the right hand rear wheel and 22 the usual brake drum. The preferred use of my device involves the use of four of them on a car, two on each axle, but all mounted adjacent the body springs as they are directly effected by the movement of the latter during driving of the car. The springs may be of various designs but those shown are sufficient to show the principle of my device.

Each of my devices comprises a vertically arranged flat bar 23 the lower end of which is perforated as at 24 for the ends of a U-bolt 25 straddling the rear axle (see Fig. 2) the nuts 26 of the U-bolt clamping the bar against the rear axle housing in vertical position. In Fig. 1 is shown how a single bolt 25ª may be used to secure the lower end of the bar to the front axle. The upper part of the bar is slidable vertically and centrally within a metal tube or shell 27 and between two vertical bars 28—29 of which 28 is about the length of the shell but 29 protrudes above it and is bent to form a horizontal arm 29ª perforated at 29ᵇ so that it may be secured as at 30 to the under side of the car body (Fig. 2) or be secured by a bolt 31 to the front end of the frame channel 9 (see Fig. 1).

The shell 27 is of rectangular form in cross section and of a size to normally loosely enclose the bars 23, 28 and 29. It is preferably made of heavy sheet metal with three single thickness walls and the fourth wall comprising two overlapping thicknesses 27ˣ, 27ʸ of the metal. Bar 29 is preferably adjacent the double wall and is threaded for screws 32 inserted through registering apertures 33 in the said double wall. Bars 28, 29 and the double wall 27ˣ, 27ʸ and the opposite wall are drilled for a bolt 34 having an adjusting nut 35 (see Figs. 3 and 5) and bar 23 is provided with a longitudinally arranged slot 24ᵇ normally within the shell and straddling the bolt 34. Above said bolt the bar 28 has its side adjacent bar 23 provided with a downwardly tapering notch 36 of any suitable length and depth and within the space provided by said notch I place a horizontally disposed roller 37 preferably made of hardened steel and of a diameter slightly less than the deepest part of the notch 36.

It will be readily understood that when the axle of the vehicle is suddenly jerked upward by the wheel or wheels rising over an obstruction on the road or by running out of a cavity therein, the body springs 11, 13, 16 will usually for a moment yield some and thus avoid giving a shock to the occupants of the vehicle, but the next moment the springs will rebound and throw the vehicle body quite high up and then let it sink again, causing a wave movement to the occupant of the car, apt to produce "sea-sickness." Now to reduce this wave motion, especially the upward part of it, this invention retards the upward movement of the car body by friction of the vertical bar 29 against one side of the bar 23, and the roller 37 against the other side of said bar 23. The amount of said friction is predetermined and regulated by the degree of incline of the bottom of the notch 36 and the adjustment of the clamping bolt 34. In other words, the degree of incline is such as to cause slidable friction but never stopping friction. I prefer to place two of my devices upon each axle, near the body springs.

What I claim is:—

1. A snubber device for automobiles consisting of a vertically disposed square tube, a short flat vertical bar fixed in one side of the tube, a longer bar also secured in the tube and having its top end protruding above the tube and adapted to be secured to the body of the vehicle, a still longer intermediate bar slidable between the two first mentioned bars and having its lower end adapted to be secured to the axle of the vehicle, means for adjusting the side bars against the sliding bar and automatic means for forcing the slidable bar against one of the fixed bars to increase the friction between them whenever the slidable bar moves downwardly in the tube.

2. The structure specified in claim 1, in which the slidable bar has a longitudinal slot and the tube has a horizontally disposed bolt through it and through said slot, and said tube being yieldable in the direction of the bolt, whereby said bolt serves as the means for adjusting the side bars against the slidable bar.

3. The structure specified in claim 1; said automatic means for increasing friction between the bars consisting of a horizontally disposed roller in a vertically elongated notch in one of the side bars and having a bottom face inclined with the lower end toward the slidable bar at a pitch calculated to produce the desired pressure on the slidable bar when the roller for want of space can roll no farther downward.

In testimony whereof I affix my signature.

CLIFTON E. MONTGOMERY.